US011965477B2

(12) United States Patent
Miller

(10) Patent No.: US 11,965,477 B2
(45) Date of Patent: Apr. 23, 2024

(54) HYDROPOWER SYSTEM FOR NATURAL BODIES OF WATER

(71) Applicant: Recep Efe Miller, Antalya (TR)

(72) Inventor: Recep Efe Miller, Antalya (TR)

( * ) Notice: Subject to any disclaimer, the term of this patent is extended or adjusted under 35 U.S.C. 154(b) by 105 days.

(21) Appl. No.: 17/510,482

(22) Filed: Oct. 26, 2021

(65) Prior Publication Data

US 2022/0268251 A1 Aug. 25, 2022

Related U.S. Application Data

(63) Continuation-in-part of application No. 17/180,731, filed on Feb. 20, 2021, now abandoned.

(51) Int. Cl.
*F03B 13/10* (2006.01)
*F03B 17/06* (2006.01)

(52) U.S. Cl.
CPC ............ *F03B 13/10* (2013.01); *F03B 17/061* (2013.01)

(58) Field of Classification Search
CPC ........ F03B 13/10; F03B 17/061; F03B 17/00; F05B 2240/97
USPC ...................................................... 290/43, 54
See application file for complete search history.

(56) References Cited

U.S. PATENT DOCUMENTS

| | | | | |
|---|---|---|---|---|
| 3,974,394 | A * | 8/1976 | Bailey | F03G 7/00 290/55 |
| 4,132,901 | A * | 1/1979 | Crausbay | E02B 9/00 417/330 |
| 4,255,933 | A * | 3/1981 | Bailey | F03G 7/04 60/676 |
| 4,282,444 | A * | 8/1981 | Ramer | F03B 13/06 290/1 R |
| 6,359,347 | B1 * | 3/2002 | Wolf | F03B 13/086 290/43 |
| 6,420,794 | B1 * | 7/2002 | Cao | F03D 9/008 290/43 |
| 6,546,723 | B1 * | 4/2003 | Watten | F03B 13/00 60/398 |
| 7,084,521 | B1 * | 8/2006 | Martin | F03B 13/086 290/53 |
| 8,643,206 | B2 * | 2/2014 | Ekern | F03B 13/06 405/76 |
| 11,053,927 | B2 * | 7/2021 | Gudesen | F03B 13/06 |
| 2010/0269929 | A1 * | 10/2010 | Dodds | E02B 9/06 137/544 |

(Continued)

*Primary Examiner* — Charles Reid, Jr.
(74) *Attorney, Agent, or Firm* — Robert L. Cantrell; Jose W. Jimenez; JIMENEZ LAW FIRM

(57) ABSTRACT

Disclose herein is a hydropower system for deployment in a natural body of water that has a at least one first cylindrical tube member disposed through a concrete block assembly and coupled to a turbine tunnel assembly designed to receive water from a natural body of water via gravitational forces acting on the water. At least one water intake with a vortex breaker is operationally coupled to the cylindrical tube member. At least one turbine generator assembly has a plurality of upwardly angled but non-vertical blade members extending therefrom around a central axis adapted to rotate an electric generator. At least one second cylindrical tube member is coupled to at least one injection hole member to at least one or more of a fault line, an underground water system, and a river system that impart energy to move the water back into the natural water cycle.

20 Claims, 11 Drawing Sheets

(56) References Cited

U.S. PATENT DOCUMENTS

| | | | | |
|---|---|---|---|---|
| 2011/0049901 | A1 * | 3/2011 | Tinnen | E21B 41/0085 290/54 |
| 2011/0140435 | A1 * | 6/2011 | Miller | E02B 9/02 290/54 |

* cited by examiner

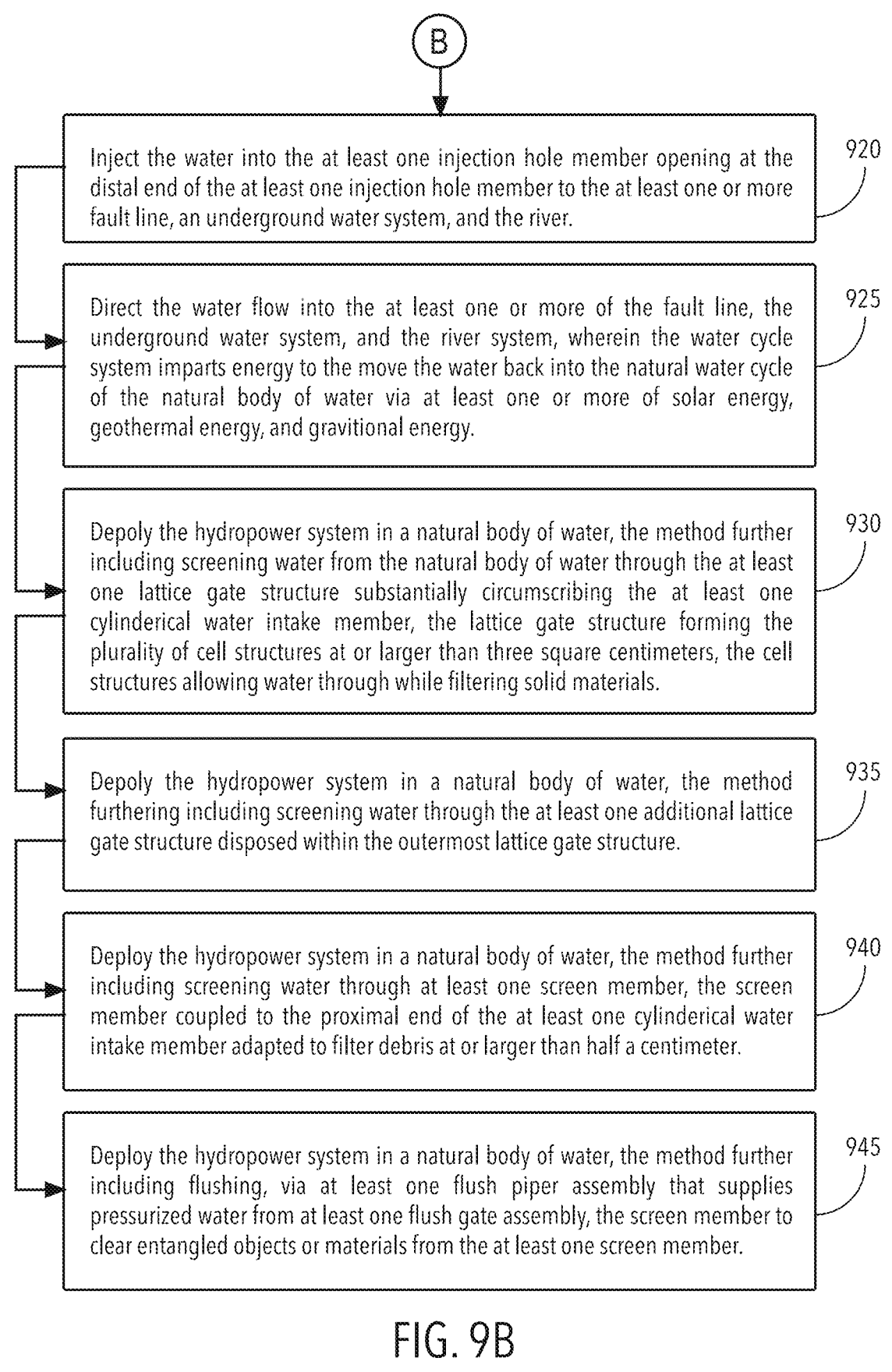

B

920 Inject the water into the at least one injection hole member opening at the distal end of the at least one injection hole member to the at least one or more fault line, an underground water system, and the river.

925 Direct the water flow into the at least one or more of the fault line, the underground water system, and the river system, wherein the water cycle system imparts energy to the move the water back into the natural water cycle of the natural body of water via at least one or more of solar energy, geothermal energy, and gravitional energy.

930 Depoly the hydropower system in a natural body of water, the method further including screening water from the natural body of water through the at least one lattice gate structure substantially circumscribing the at least one cylinderical water intake member, the lattice gate structure forming the plurality of cell structures at or larger than three square centimeters, the cell structures allowing water through while filtering solid materials.

935 Depoly the hydropower system in a natural body of water, the method furthering including screening water through the at least one additional lattice gate structure disposed within the outermost lattice gate structure.

940 Deploy the hydropower system in a natural body of water, the method further including screening water through at least one screen member, the screen member coupled to the proximal end of the at least one cylinderical water intake member adapted to filter debris at or larger than half a centimeter.

945 Deploy the hydropower system in a natural body of water, the method further including flushing, via at least one flush piper assembly that supplies pressurized water from at least one flush gate assembly, the screen member to clear entangled objects or materials from the at least one screen member.

FIG. 9B

HYDROPOWER SYSTEM FOR NATURAL BODIES OF WATER

CLAIM OF PRIORITY

This application is a continuation in part of and claims priority to, and the benefit of, U.S. utility application with Ser. No. 17/180731, filed on Feb. 20, 2021, with the same title, the contents of which is incorporated by reference in its entirety.

FIELD OF THE INVENTION

The inventive concept relates generally to a hydropower system for deployment in a natural body of water.

BACKGROUND

People have used flowing water in streams and rivers to produce mechanical energy for centuries. Hydropower was one of the first sources of energy used for electricity generation. Currently, hydropower is generated from water moving from a higher elevation to a lower elevation as happens via a river, waterfall, or stored water released from a reservoir. Alternatively, ocean waves or currents may be used. Scarcity of water, however, can limit the availability of hydroelectric power.

Large-scale hydropower plants can mean a loss of ecosystem in upstream and down-stream river systems and in loss of land due to reservoirs. Projects can take years to plan and complete and may be capital intensive. The life of hydropower plants may be limited to approximately 25 years for machinery and 50-100 years for the civil works. Droughts threaten reliability. Methane released from reservoirs may be hazardous to the environment.

Although the International Energy Agency (IEA) considers hydropower among the least costly form renewable power generation, damage to environments cause by dams has spurred dismantling of dams. Aging reservoirs have become inefficient, harmful impacts to local ecosystem and habitat can be significant, and accumulating research suggests that hydropower reservoirs may be a much larger contributor of methane release into the atmosphere. Therefore, there is a need in the marketplace for an improved hydropower solution.

SUMMARY OF THE INVENTION

Disclose herein is a hydropower system for deployment in a natural body of water that has a at least one first cylindrical tube member with an open proximal end disposed through a at least one concrete block assembly and an open distal end coupled to a top portion of a turbine tunnel assembly, a turbine assembly therein, the at least one first cylindrical tube member designed to carry water from a natural body of water to the turbine tunnel assembly via gravitational forces acting on the water. The at least one first cylindrical tube member may be termed a penstock. At least one water intake member is coupled at a distal end of the cylindrical water intake member to the proximal end of the at least one first cylindrical tube member and at least partially extends from the at least one concrete block assembly and into the natural body of water. A proximal end of the at least one cylindrical water intake member is coupled to at least one vortex breaker member having at least one first stationary blade member and at least one second stationary blade member, the at least one second stationary blade member intersecting the first stationary blade member along the length of the first stationary blade member wherein the blade members share a substantially common width, the width perpendicular to the length, the first stationary blade member and the at least one second stationary blade member designed for water to pass substantially without a vortex between and into the water intake member.

At least one turbine generator assembly has a plurality of upwardly angled but non-vertical blade members extending therefrom around a central axis. The blade members are designed to rotate an electric generator assembly disposed within the turbine generator assembly to generate electricity therefrom. The plurality of blade members is rotated by the flow of water over the blades. The water is gravitationally disposed from the at least one first cylindrical tube member. At least one second cylindrical tube member is coupled at a proximal end of the at least one second cylindrical tube member to a bottom portion of the turbine tunnel assembly. The at least one second cylindrical tube member is coupled at a distal end of the at least one first cylindrical tube member to a top portion of an at least one injection hole member. The at least one injection hole member opens at a distal end of the at least one injection hole member to at least one or more of a fault line, an underground water system, and a river system. The at least one or more of the fault line, the underground water system, and the river system is disposed to impart energy to move the water back into the natural water cycle of the natural body of water via at least one or more of solar, geothermal, and gravitational energy.

In one embodiment of the hydropower system for deployment in a natural body of water, at least one lattice gate structure substantially circumscribes the cylindrical water intake member, the lattice gate structure designed to form a plurality of cell structures at or larger than three square centimeters, the cell structures designed to allow water through while filtering solid materials.

In one embodiment of the hydropower system for deployment in a natural body of water, the outermost of the at least one lattice gate structure is substantially at least forty meters wide by forty meters long by forty meters tall.

In one embodiment of the hydropower system for deployment in a natural body of water, at least one additional lattice gate structure is disposed within the outermost lattice gate structure.

In one embodiment of the hydropower system for deployment in a natural body of water, wherein at least one screen member is coupled to the proximal end of the at least one cylindrical water intake member designed to filter debris at or larger than half a centimeter.

In one embodiment of the hydropower system for deployment in a natural body of water, at least one flush pipe assembly supplies pressurized water from at least one flush gate assembly designed to clear entangled objects or materials from the at least one screen member.

In one embodiment of the hydropower system for deployment in a natural body of water, the cylindrical water intake member is disposed at least eighty meters below the average surface level of the natural body of water.

In one embodiment of the hydropower system for deployment in a natural body of water, at least one ventilation tower and lift assembly is operationally coupled to the turbine tunnel assembly and designed to provide access to the surface ground and atmosphere.

In one embodiment of the hydropower system for deployment in a natural body of water, the at least one first cylindrical tube member descends substantially forty meters or more below the cylindrical water intake member.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 9A and 9B illustrate a method of the hydroelectric power plant operation.

DETAILED DESCRIPTION OF THE INVENTION

Figure 1:
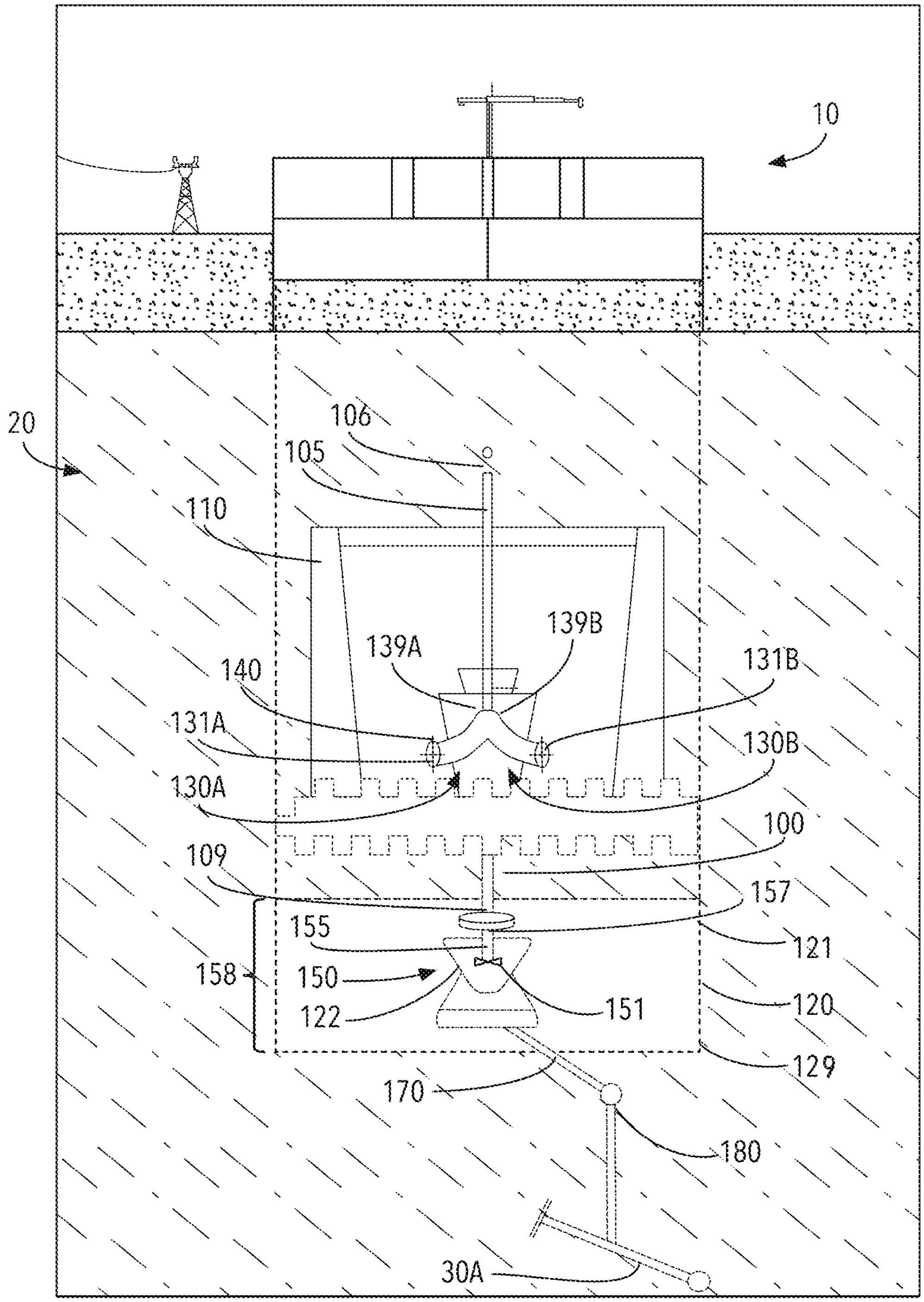
FIG. 1 illustrates the hydroelectric power plant: front view.
Figure 2:
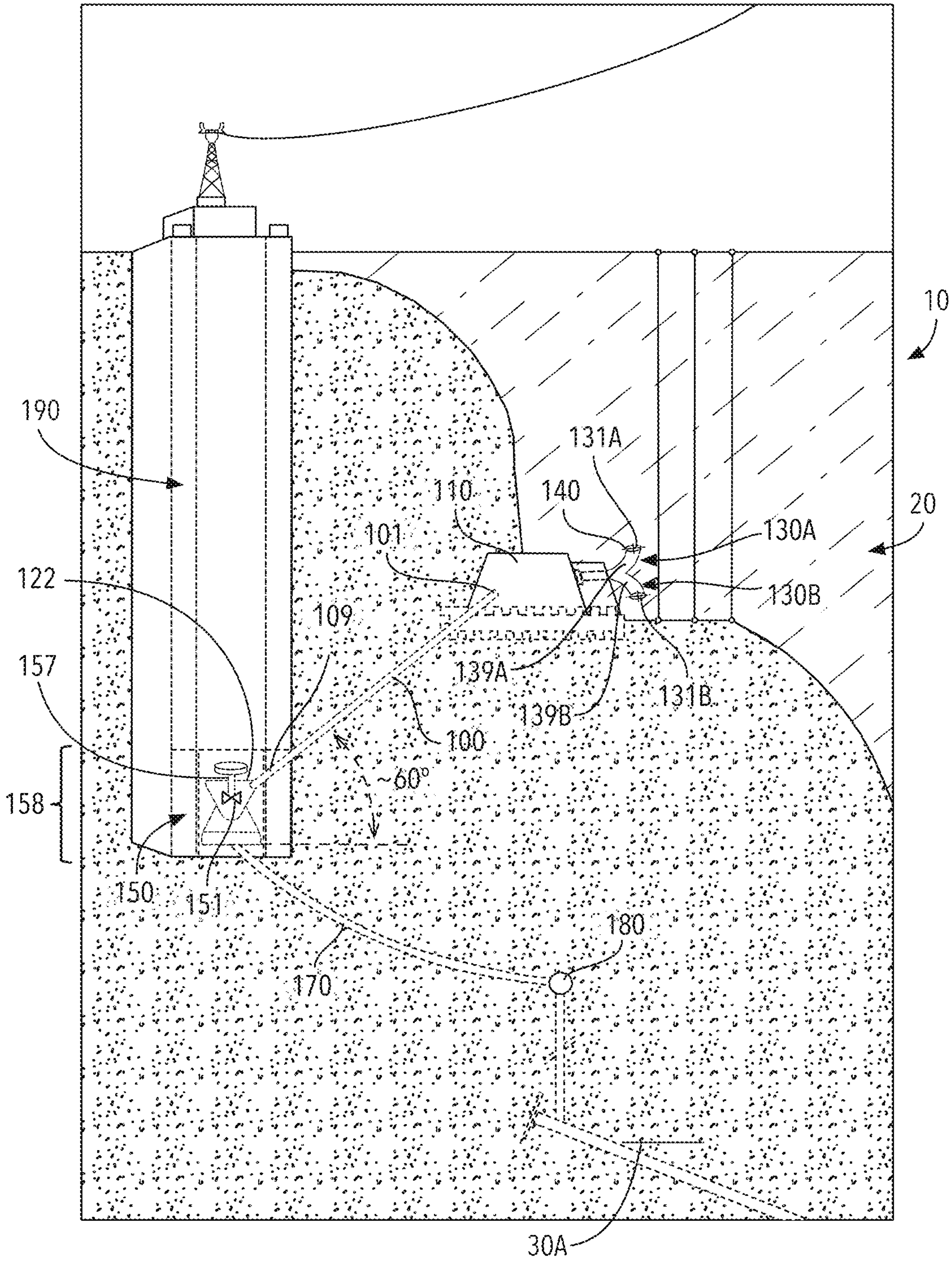
FIG. 2 illustrates the hydroelectric power plant: side view.
Figure 3:
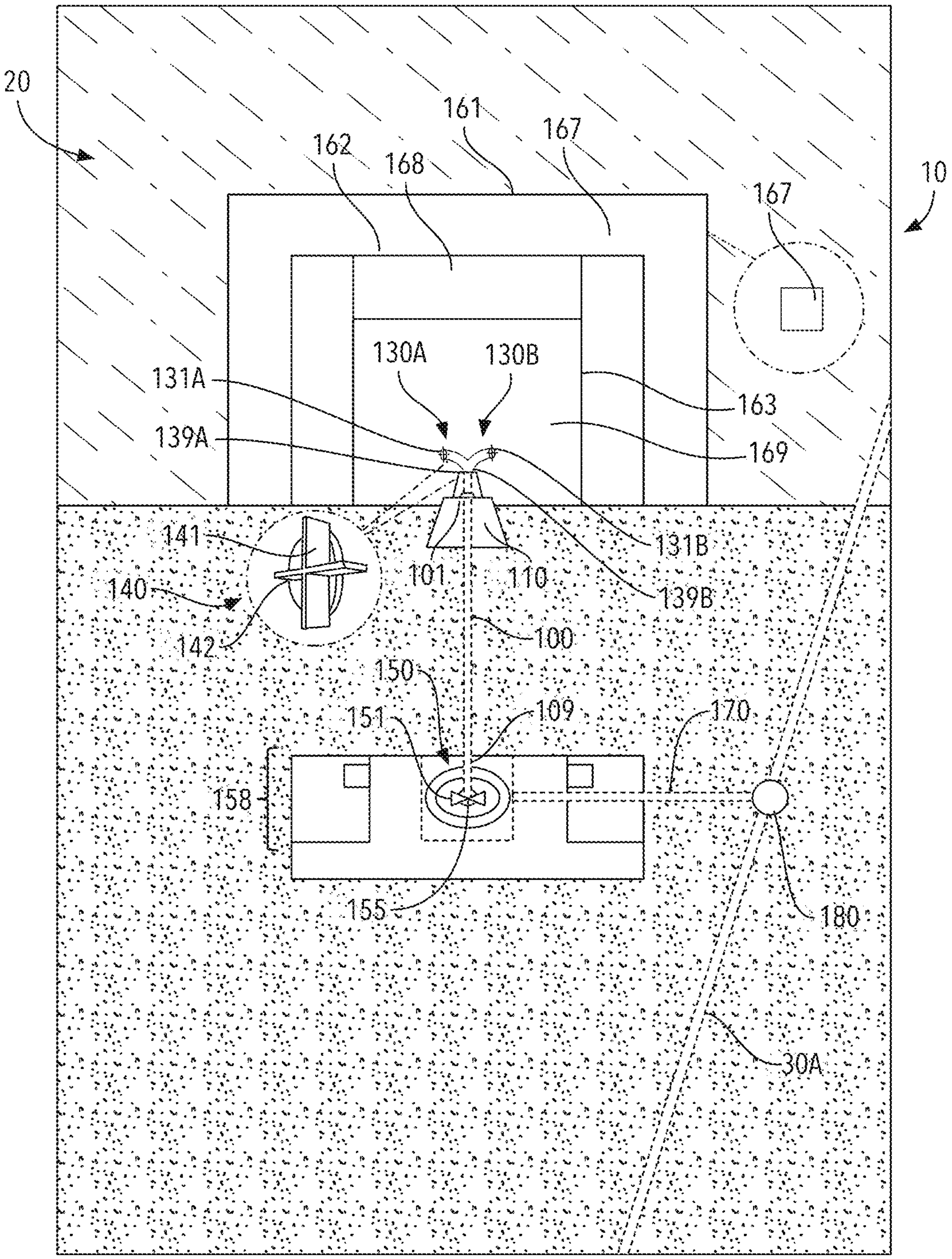
FIG. 3 illustrates the hydroelectric power plant: top view.
Figure 4:
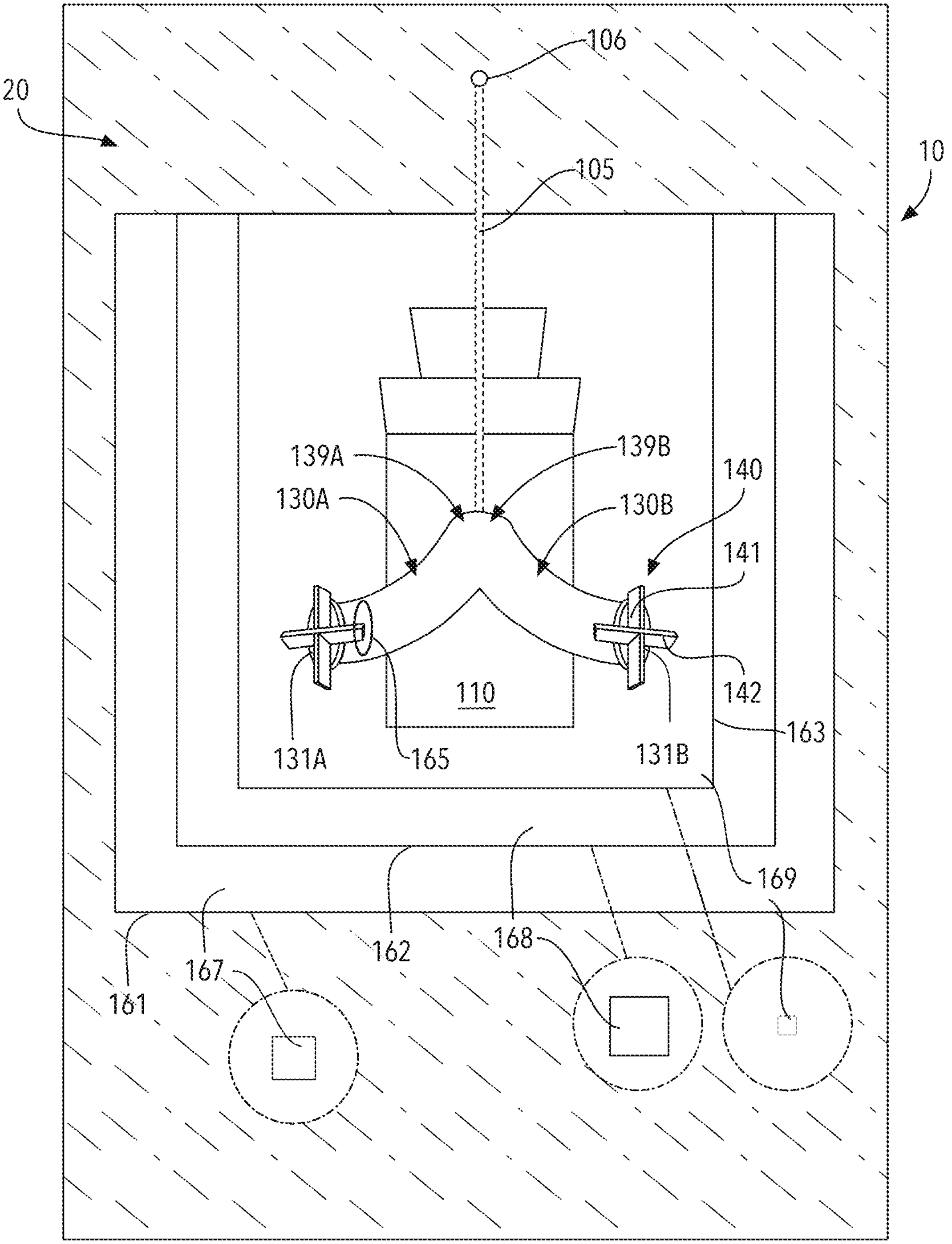
FIG. 4 illustrates the water intake zone: front view.
Figure 5:
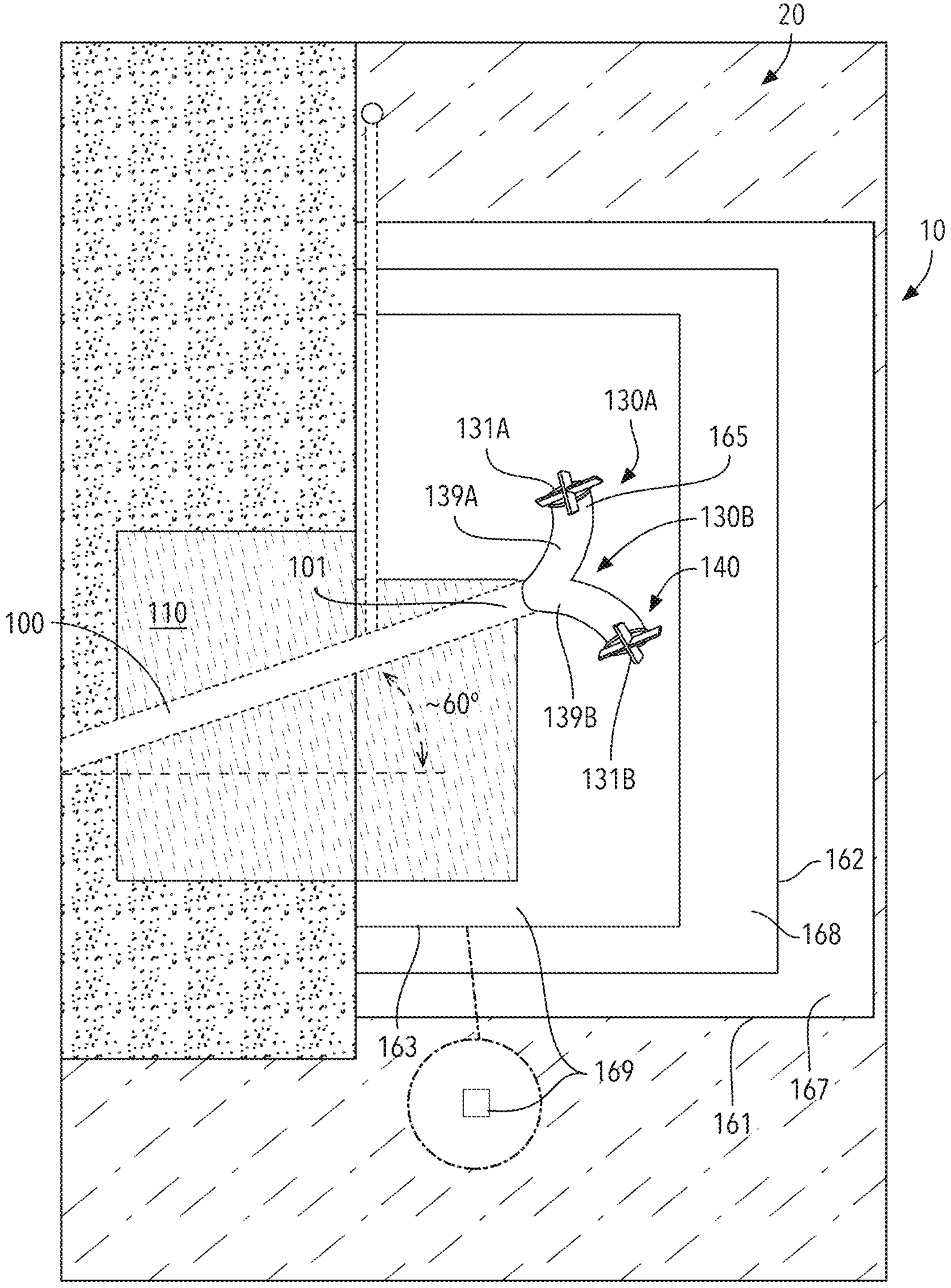
FIG. 5 illustrates the water intake zone: side view.
Figure 6:
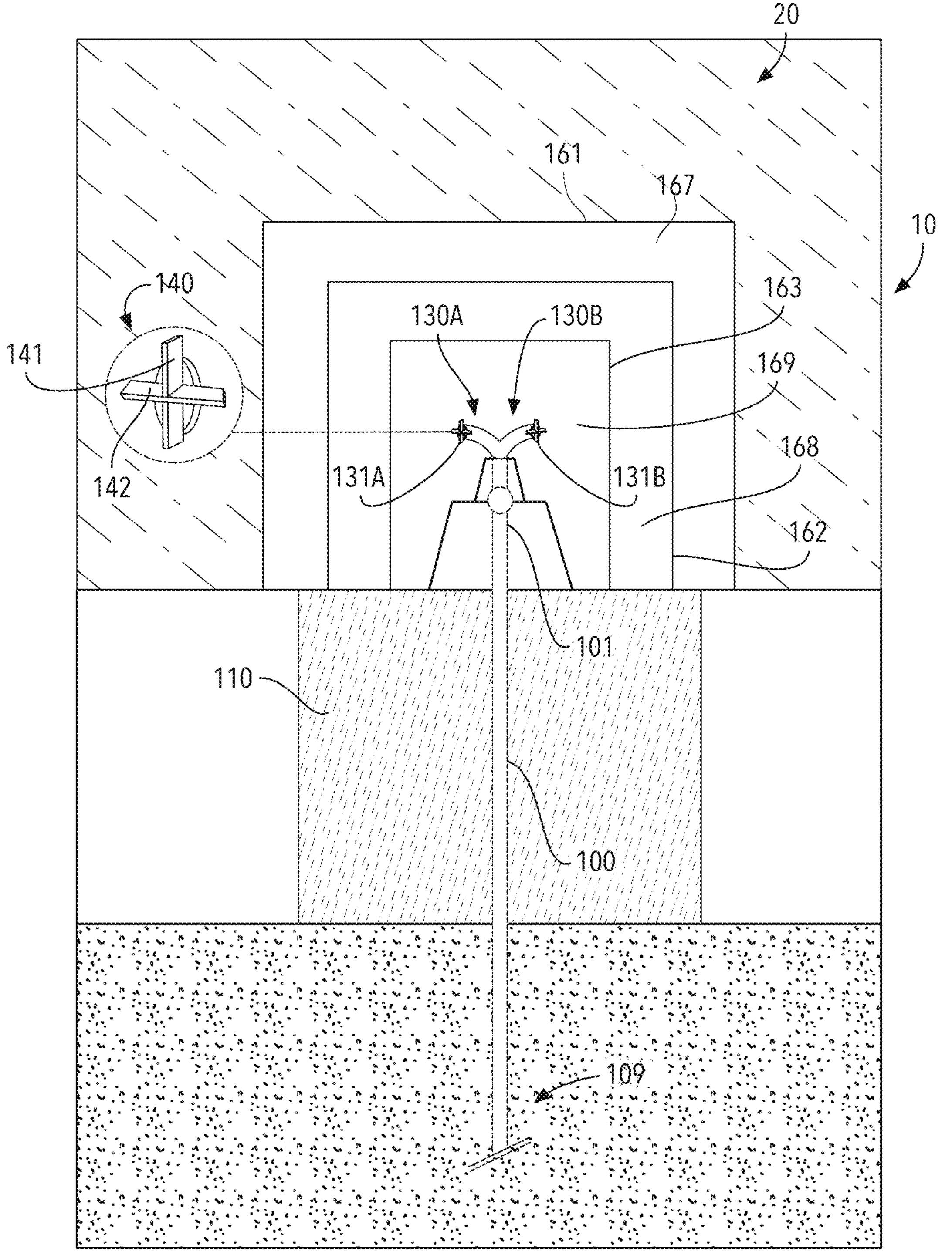
FIG. 6 illustrates the water intake zone: top view.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Scientists define energy as the ability to do work. Energy sources can be categorized as renewable or nonrenewable. Renewable energy sources include hydroelectric power. Hydroelectric can be used as primary energy source for conversion, in most instances, into electricity.

The inventive concept, a hydropower system for deployment in a natural body of water, relies upon flowing water descending from a high elevation to a lower elevation and, therefore, relies on the natural water cycle. The natural water cycle follows the laws of thermodynamics where water in a higher energy state flows to a lower energy state unless new energy is imparted upon it. The natural water cycle has three steps: 1) solar energy that heats water on the surface of rivers, lakes, and oceans and causes the water to evaporate; 2) water vapor that condenses into clouds and falls as precipitation—rain and snow; 3) precipitation that collects in pools, streams, and rivers, the streams and rivers which empty into oceans and lakes, where the water evaporates and begins the cycle again. Solar energy, by heating water and promoting evaporation from liquid form, elevates water into the sky where it falls upon the ground at levels higher than sea level. The potential energy available from the distance a water descends from one storage source to another storage source at a lower altitude is energy that the inventive concept uses to turn a turbine and generator, converting kinetic energy from the water into electricity. Hydropower may, therefore, be indirect solar power, dependent on thermodynamics go store energy and gravity to release energy.

An exception to the above, relevant to the preferred embodiment of the inventive concept, is a natural water cycle dependent on geothermal energy generated from inside earth. The geothermal energy is tapped to elevate water, geothermal energy generated from the residual heat of planet formation, frictional heat of a sinking core, and heat from decaying radioactive elements.

Hydroelectric power in the representative embodiments is produced via the kinetic force of moving water, that water propelled by gravity. The traditional approach to hydroelectric power is to build a dam on a large river that has a significant drop in elevation. The most common type of hydroelectric power plant uses a dam on a river to store water in a reservoir, thereby providing for a controlled release of that water. The dam stores water and, therefore, energy, behind the dam and within the reservoir. In general, the greater the water flow and the higher the head, the more electricity a hydropower plant can produce. Water released from its source is directed through a turbine assembly, spinning the turbine, which in turn activates the generator to produce electricity. At the end of a penstock—a substantially cylindrical tube assembly that carries water from its source—there is a turbine propellor turned by the moving water.

A penstock is a sluice or gate or intake structure that controls water flow, or an enclosed pipe that delivers water to hydro turbines and sewerage systems. The term is inherited from the earlier technology of mill ponds and watermills. The shaft from the turbine goes up into the generator, which produces electricity that can be used for power.

The turbine in the representative embodiment is hydraulic and converts the energy of flowing water into mechanical energy. The generator converts the mechanical energy into electricity. Power lines may carry the electricity to a place of use.

For an illustration of the disclosed embodiments, hydroelectric power generated from an intake at 85 meters of a body of water, with the penstock at net 40-meters below the intake, can be calculated via the equation: $P=m\times g\times H_{net}\times\eta$ Where: P power is measured in Watts (W), m=mass flow rate in kg/s (numerically the same as the flow rate in liters/second because 1 liter of water weighs 1 kg), g=the gravitational constant, which is 9.81 $m/s^2$, Hnet=the net head, this being the gross head physically measured at the site, less any head losses, assumed, in this illustration, a head losses of 10%, so Hnet=Hgross×0.9, η=the product of all of the component efficiencies, which are normally the turbine, a drive system, and the generator. In one illustrated embodiment, turbine efficiency would be greater than 90%, drive efficiency 95%, and generator efficiency 93%, so the overall system efficiency would be: 0.90×0.95×0.93=0.7951 or 79.5%. Therefore, a relatively high gross head of 120 meters, and a turbine that could take a maximum flow rate of 44 $m^3/s$, the maximum power output of the system would be:

$$\begin{aligned}\text{Power } (W) &= m\times g\times H_{net}\times\eta\\ &= 44{,}000(\text{fresh water})\times 9.81\times 108\times 0.79\\ &= 36{,}827{,}524.8\text{ Watt}\\ &= 36{,}827.5\text{ kW}\\ &= 36.83\text{ mW}\end{aligned}$$

-continued $$= 45{,}320(\text{salt water}) \times 9.81 \times 108 \times 0.79$$
$$= 37{,}932{,}350.5 \text{ Watt}$$
$$= 37{,}932.4 \text{ kW}$$
$$= 37.93 \text{ mW}$$

The inventive concept emulates a large-scale hydropower plant, without requiring a dammed reservoir, by using oceans, seas, or lakes as the water source, referred to as the natural body of water. An ocean, sea, or lake assumes the role as natural reservoirs and the natural body of water. The water intake, in the preferred embodiment, is below 85 meters or lower than the surface level of the body of water. Water, in the preferred embodiment, will be returned to the same body of water of its origination via geothermal energy. Water is discharging directly into a fault-line which has under water/ground connection with the natural body of water. Water may return to the natural body of water via an all-natural cycle or may be facilitated by added construction such as pipes and condensers.

Figure 8A:
FIG. 8A illustrates a fault zone of Turkey.
Figure 8B:
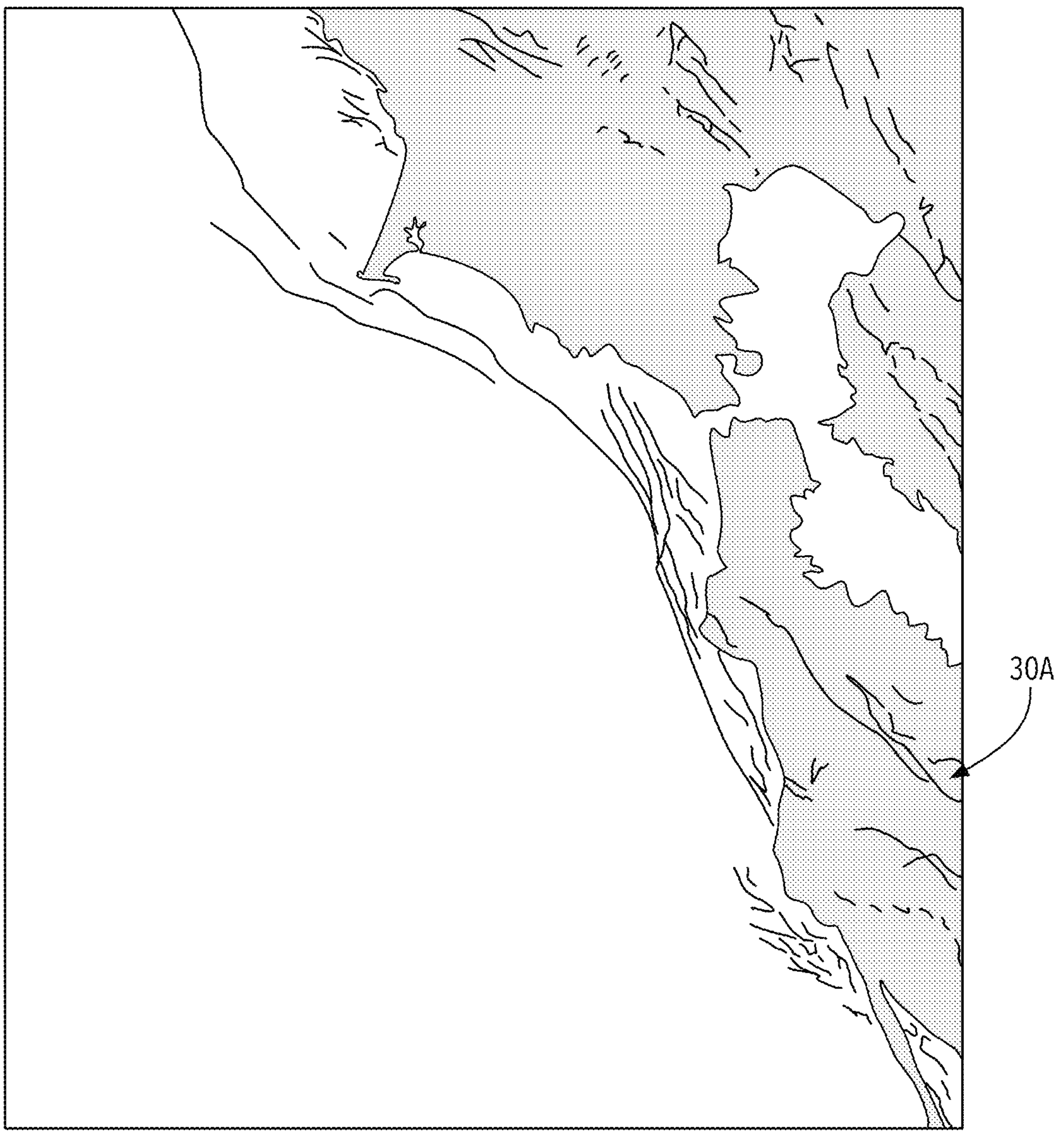
FIG. 8B illustrates a fault zone of California.

For the preferred embodiment of the inventive concept, the pre-requisite for installation is proximity to a normal-fault line that has an extension to the natural body of water used as a water source. FIG. 8A illustrates fault lines in the California Bay Area and FIG. 8B illustrates fault-lines in Western Turkey. US Geological Survey (USGS) www.usgs-.gov; and Turkish authority, MTA, www.mta.gov.tr internet sites provide detailed, (1:25.000) scale, fault-line maps. Alternatively, the discharged water may flow to another body of water disposed at a lower elevation than the originating source and, therefore, at a lower-energy state.

The fault-line for the preferred embodiment of the inventive concept should be normal fault. A normal fault is a dip-slip fault in which the block above the fault has moved downward relative to the block below. This type of faulting occurs in response to extension and is often observed in the Western United States Basin and Range Province and along oceanic ridge systems. In a normal fault, the banging wall moves downward, relative to the footwall. A downthrown block between two normal faults dipping towards each other is a graben. An upthrown block between two normal faults dip away from each other. Low-angle normal faults with regional tectonic significance may be designated detachment faults.

FIGS. 8A and 8B illustrate fault-lines extending through the ocean or sea. The areas where the land meets the ocean or sea are possible locations for the inventive concept. Three important parameters clarify the pattern of fault-line related to extension and fault capacity. 1) Whether the fault-line is connected to the ocean or sea; 2) the type of the fault-line, the inventive concept requiring a vertically positioned, "normal type" fault-line; 3) the water absorption capacity of the fault-line, wherein the installed capacity is determined.

In the disclosed embodiment of the inventive concept, strainers inside the water intake keep marine organisms from being drawn down the penstock. Flush Pipes supply pressurized water from a flush gate to clear-out entangled objects or materials as necessary. In the disclosed embodiment, the water intake zone is at substantially 80 meters below surface or deeper where lack of photosynthesis may reduce fouling from photosynthesizing life.

A cascading layer formed by a lattice gate structure assembly keeps marine creatures away from the water intake zone. An at least one vortex breaker diminishes whirls or vortices that may otherwise draw creatures and other debris into the penstock.

The inventive concept may be installed along a shoreline where a seismic survey may be needed to select natural water source for water used to spin the hydroelectric turbine blades by which to generate electric power. Because water circulates within the perimeter of the same water source via one or more of a solar or geothermal natural water cycle, there is no substantial depletion of water because of power generation. No substantial waste is a biproduct of power generation, substantially no added emission beyond natural emissions, and so forth.

The inventive concept circulates water in and out of the same natural water source. The water intakes are disposed substantially below 80 meters and carried through the penstock. After turning the turbine blades, the water may return to the same reservoir. The at least one or more of solar and geothermal energy sources afford energy to recirculate water back to the natural water source. Alternatively, water may be disposed at an elevation lower than the original water source.

In one embodiment of the inventive concept, geothermal energy from geothermal sources associated with the connecting fault line provides the energy to return water to into the natural water source.

One embodiment of the inventive concept is coupled to an evaporation farm solution, the evaporation farm solution designed to facilitate the evaporation of water from a source such as an ocean where the water would ultimately return to the natural water source via the atmosphere.

The inventive concept can create a substantially self-perpetuating power source wherein a natural power source of at least one or more of solar energy, geothermal energy, and gravitational energy serve to keep water in motion. Natural precedents of water motion are illustrated through such phenomenon as ocean currents where the laws of thermodynamics keep bodies of water in motion at least one or more of horizontally and vertically throughout the associated water system.

In the preferred embodiment, the inventive concept is installed within proximity of a fault line having the absorption capacity of waterflow able to generate substantially between 50 kilowatts to 5 megawatts per hour and upwards, in some instances, of 1 to 10 gigawatts, as calculated using the equation illustrated in Power $(W)=m\times g\times H_{net}\times\eta$.

To prevent marine organisms from entering the intake zone of the penstock, a cubical form of outer lattice gate structures with, in one illustrative embodiment, 80×80×80 meters, made out at least one or more of a metal, ceramic, and a polymer, may be installed. Another illustrative embodiment is 40×40×40 meters. The lattice gate structures filter potentially dangerous items from the water intake zone such as sea organisms and debris. A minimum cell size is 3 to 5 square centimeters. The outer lattice gate structure is the first level of protection for marine creatures and the other stuff.

At the inlet of the penstock, the outer most section, there will be a convex shaped structure made from reinforced at least one or more of a metal, ceramic, and polymer plate to function as the vortex breaker. Next to the vortex breakers, there will be one or more metal screens to strain water flowing into the intakes. In one embodiment of the inventive concept, seven different layers will screen debris as small as 0.5 centimeters. The screens act as second level of strainers and will be the second level of protection to keep marine organisms and other debris out of the water intake.

The inventive concept, in the representative embodiment, requires ten to twenty thousand square meters of land to install the ground facilities and includes a plurality of marine concrete blocks, a turbine tunnel assembly, the powerhouse assembly, the penstock, and a discharge pipe.

The inventive concept can provide energy for people living on lake shorelines. In these embodiments, such as Lake Victoria and Lake Erie depths are respectively between 84 meters and 64 meters of depth. Such embodiments are proper for low-head turbine systems. Lake systems may further facilitate discharge into water bodies lower than the source such as a river system or other lake system, and the lake may be coupled with a fault line system for discharge and returning water to the original water source.

FIGS. 1 to 6 illustrate one representative hydropower system 10 for deployment in the natural body of water 20 has a first cylindrical tube member 100, the penstock, of forty or greater meters long and a diameter at or greater than two meters with an open proximal end disposed through a concrete block assembly 110, which may be made from the plurality of marine concrete blocks, and an open distal end 109 of the first cylindrical tube member 100 coupled to a top portion of the turbine generator assembly 150, and the turbine generator assembly 150 therein. The first cylindrical tube member 100 is designed to carry water from the natural body of water 20 to the turbine tunnel assembly 120 via gravitational forces acting on the water. Two oppositely facing, cylindrical water intake members 130A and 130B are coupled at respective distal ends 139A and 139B of the cylindrical water intake members 130A and 130B to an open proximal end 101 of the first cylindrical tube member 100 and at least partially extending from the concrete block assembly 110 and into the natural body of water 20.

FIGS. 1 to 6 further illustrate that the cylindrical water intake members 130A and 130B are disposed at least eighty meters below the average surface level of the natural body of water 20. Proximal ends 131A and 131B of the two cylindrical water intake members 130A and 130B are each coupled to the at least one vortex breaker member 140 having at least one first stationary blade member 141 and at least one second stationary blade member 142. The at least one second stationary blade member 142 intersects the first stationary blade member 141 along the length of the first stationary blade member 141 wherein the blade members 141, 142 share a substantially common width, the width perpendicular to the length, the first stationary blade member 141 and the at least one second stationary blade member 142 designed for water to pass substantially without a vortex between and into the two oppositely facing cylindrical water intake members 130A and 130B.

FIGS. 1 to 6 further illustrate that at least one turbine generator assembly 150 has a plurality of upwardly angled but non-vertical blade members 151 extending therefrom around a central axis 155. The non-vertical blade members 151 are designed to rotate the electric generator assembly 157 disposed within the turbine generator assembly 150 to generate electricity therefrom, the assembly of which may be termed the powerhouse assembly 158. The plurality of non-vertical blade members 151 is rotated kinetically by the flow of water over the blades, the water gravitationally disposed from the first cylindrical tube member 100.

Figure 7:
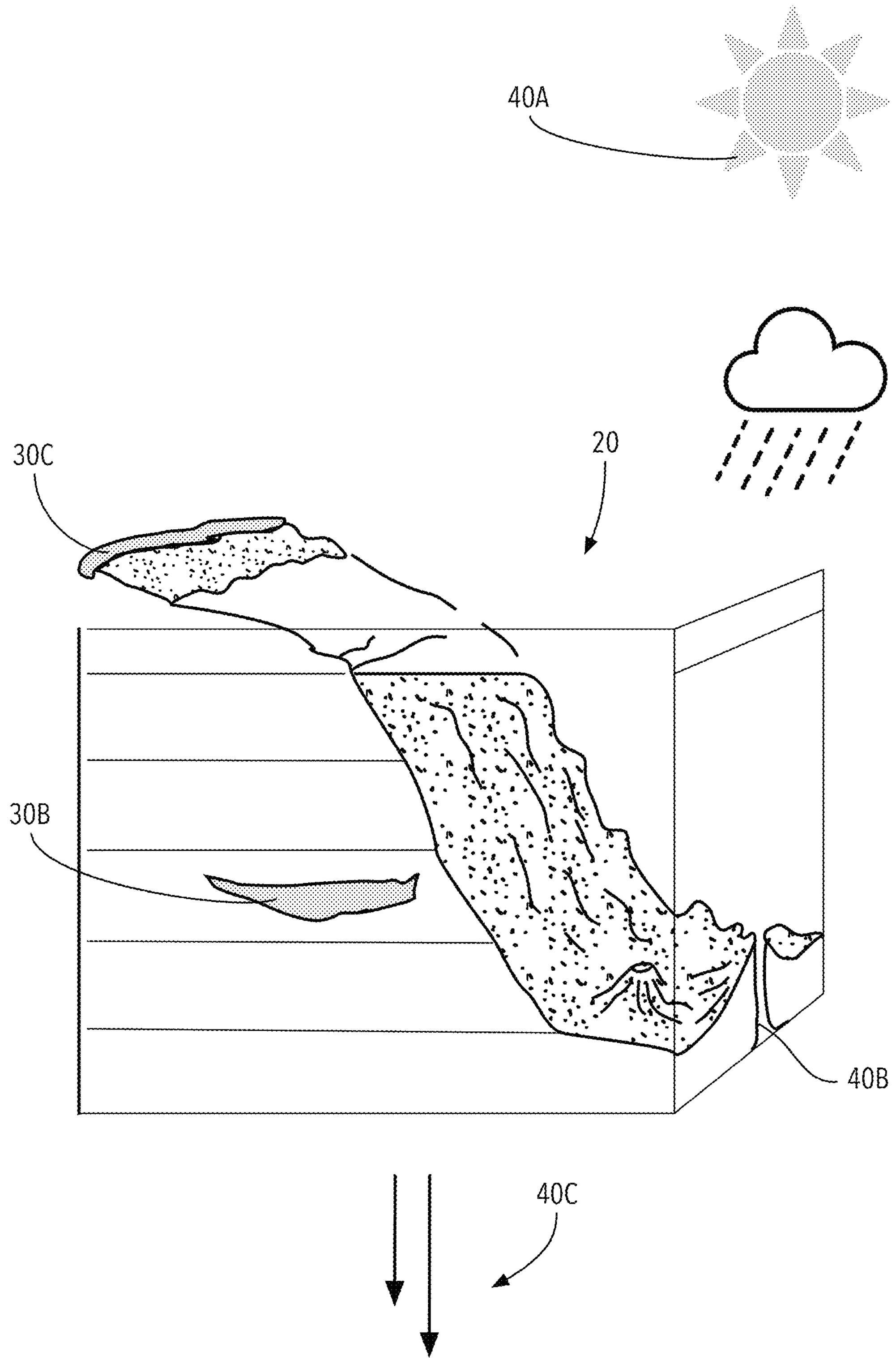
FIG. 7 illustrates a representative water cycle.

FIGS. 1 to 6 further illustrate an outermost lattice gate structure 161 substantially circumscribes the two oppositely facing cylindrical water intake members 130A and 130B about forty meters from the two oppositely facing cylindrical water intake members 130A and 130B. The outermost lattice gate structure 161 is designed to form a plurality of outermost cell structures 167 at or larger than five square centimeters. The outermost cell structures 167 are designed to allow water through while filtering solid materials. A middle lattice gate structure 162 substantially circumscribes the two oppositely facing cylindrical water intake members 130A and 130B about twenty meters from the two oppositely facing cylindrical water intake members 130A and 130B. The middle lattice gate structure 162 is designed to form a plurality of middle cell structures 168 at or larger than three square centimeters. The middle cell structures 168 are designed to allow water through while filtering solid materials. An innermost lattice gate structure 163 substantially circumscribes the two oppositely facing cylindrical water intake members 130A and 130B about ten meters from the two oppositely facing cylindrical water intake members 130A and 130B. The innermost lattice gate structure 163 designed to form a plurality of innermost cell structures 169 at or larger than one square centimeter. The innermost cell structures 169 are designed to allow water through while filtering solid materials. At least one second cylindrical tube member 170 is coupled at a proximal end of the at least one second cylindrical tube member 170 to a bottom portion of the turbine tunnel assembly 129. The at least one second cylindrical tube member 170 is coupled at a distal end 109 of the first cylindrical tube member 100 to a top portion of an at least one injection hole member 180, the at least one injection hole member opening at a distal end of the at least one injection hole member 180 to, as illustrated in FIGS. 7, 8A, and 8B, at least one or more of the fault line 30A, an underground water system 30B, and a river system 30C. The at least one or more of the fault line 30A, the underground water system 30B, and the river system 30C is disposed to impart energy to move the water back into the natural water cycle of the natural body of water 20 via at least one or more of solar 40A, geothermal 40B, and gravitational energy 40C.

FIGS. 1 to 6 further illustrate that in one representative embodiment of the hydropower system 10 for deployment in a natural body of water 20, at least one screen member 165 is coupled to the proximal end of the two oppositely facing cylindrical water intake members 130A and 130B designed to filter debris at or larger than half a centimeter. In one representative embodiment of the hydropower system 10 for deployment in a natural body of water 20, at least one flush pipe assembly 105 supplies pressurized water from at least one flush gate assembly 106 designed to clear entangled objects or materials from the at least one screen member 165. In one representative embodiment of the hydropower system 10 for deployment in a natural body of water 20, the two oppositely facing cylindrical water intake members 130A and 130B are disposed at least eighty meters below the average surface level of the natural body of water 20.

FIGS. 1 to 6 further illustrate that in one representative embodiment of the hydropower system 10 for deployment in the natural body of water 20, at least one ventilation tower and lift assembly 190 is operationally coupled to the turbine tunnel assembly 120 and designed to provide access to the surface ground and atmosphere. In one representative embodiment of the hydropower system 10 for deployment in a natural body of water 20, the first cylindrical tube member 100 descends substantially forty meters or more below the two oppositely facing cylindrical water intake members 130A and 130B.

Figure 9A:
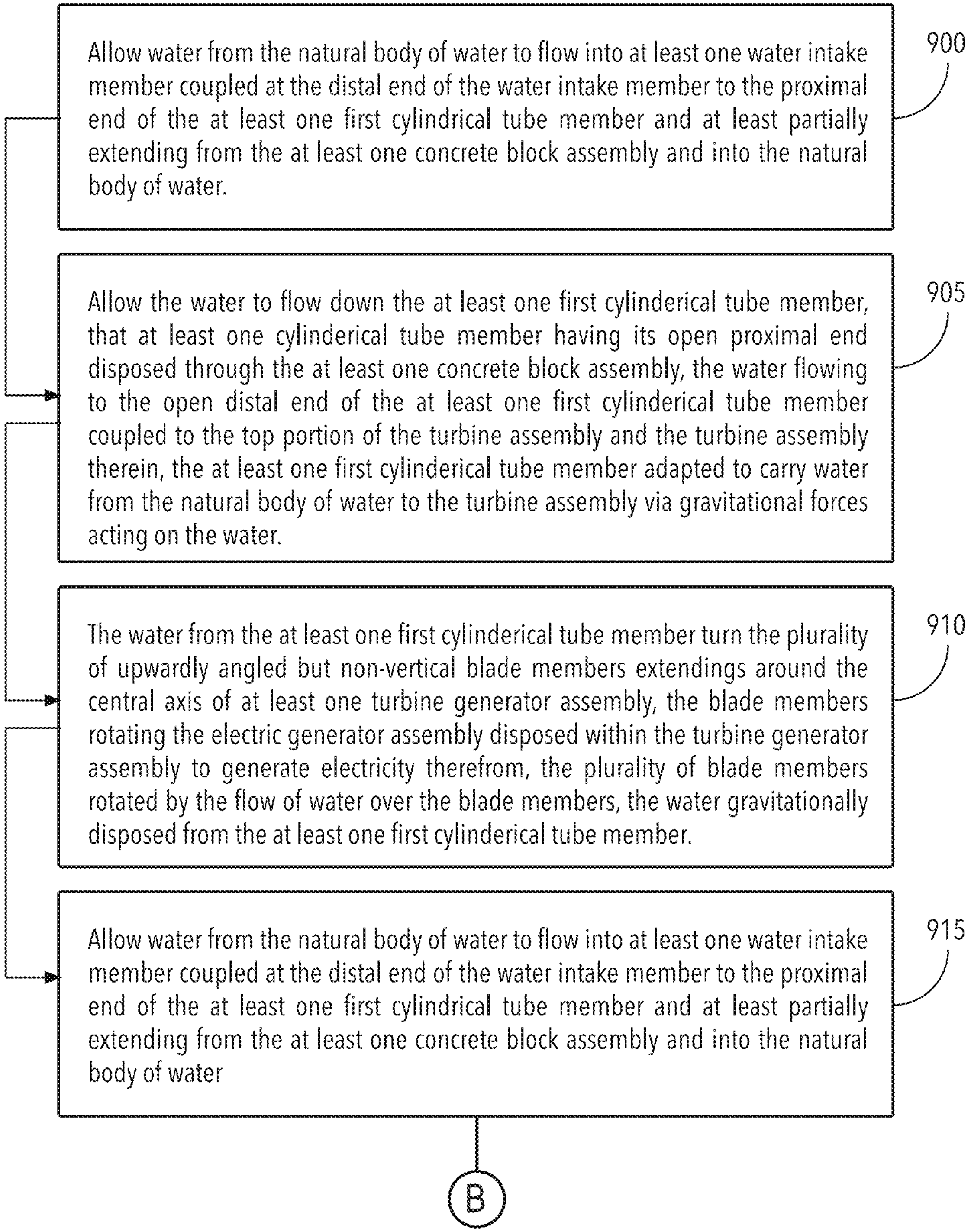

FIGS. 9A and 9B illustrate a representative method of deploying the hydropower system 10 in a natural body of water 20. The method includes the step 900, allowing water from the natural body of water 20 to flow into at least one water intake member 130A, 130B coupled at the respective distal end 139A, 139B of the water intake member 130A, 130B to the proximal end 101 of the at least one first cylindrical tube member 100 and at least partially extending from the at least one concrete block assembly 110 and into the natural body of water 20.

FIGS. 9A and 9B further illustrate that the method further includes the step 905, allowing the water to flow down the at least one first cylindrical tube member 100, the at least one first cylindrical tube member 100 having its open proximal end 101 disposed through the at least one concrete block assembly 110, the water flowing to the open distal end 109 of the at least one first cylindrical tube member 100 coupled to the top portion of the turbine tunnel assembly 121 and the turbine assembly 122 therein, the at least one first cylindrical tube member 100 designed to carry water from the natural body of water to the turbine tunnel assembly 120 via gravitational forces acting on the water.

FIGS. 9A and 9B further illustrate that the method further includes the step 910, the water from the at least one first cylindrical tube member 100 turning the plurality of upwardly angled but non-vertical blade members 151 extending around the central axis of at least one turbine generator assembly 150, the non-vertical blade members 151 rotating the electric generator assembly disposed within the turbine generator assembly 150 to generate electricity therefrom, the plurality of non-vertical blade members 151 rotated by the flow of water over the non-vertical blade members 151, the water gravitationally disposed from the at least one first cylindrical tube member 100.

FIGS. 9A and 9B further illustrate that the method further includes the step 915, allowing the water to flow into at least one second cylindrical tube member 170 coupled at the proximal end of the at least one second cylindrical tube member 170 to the bottom portion of the turbine tunnel assembly 120, the at least one second cylindrical tube member 170 coupled at the distal end 109 of the at least one first cylindrical tube member 100 to the top portion of the at least one injection hole member 180.

FIGS. 9A and 9B further illustrate that the method further includes the step 920, injecting the water into the at least one injection hole member 180 opening at the distal end of the at least one injection hole member 180 to at least one or more of the fault line 30A, an underground water system 30B, and the river system 30C. The method further includes the step 925, directing the water flow into the at least one or more of the fault line 30A, the underground water system 30B, and the river system 30C, wherein the water cycle system imparts energy to move the water back into the natural water cycle of the natural body of water via at least one or more of solar energy 40A, geothermal energy 40B, and gravitational energy 40C.

FIGS. 9A and 9B further illustrate that the method may further include the step 930, of deploying the hydropower system 10 in a natural body of water 20, the method further including screening water from the natural body of water 20 through the at least one lattice gate structure 161, 162, 163 substantially circumscribing cylindrical water intake members 130A, 130B, the lattice gate structure 161, 162, 163 forming the plurality of cell structures 167, 168, 169 at or larger than three square centimeters, the cell structures 167, 168, 169 allowing water through while filtering solid materials.

FIGS. 9A and 9B further illustrate that the method may further include the step of 935, deploying the hydropower system 10 in a natural body of water 20, the method further including screening water through the at least one additional lattice gate structure 162, 163 disposed within the outermost lattice gate structure 161.

FIGS. 9A and 9B further illustrate that the method may further include the step of 940, deploying the hydropower system 10 in a natural body of water 20, the method further including screening water through at least one screen member 165, the screen member 165 coupled to the proximal ends 131A, 131B of the at least one cylindrical water intake member 130A, 130B designed to filter debris at or larger than half a centimeter.

FIGS. 9A and 9B further illustrate that the method may further include the step of 945, deploying the hydropower system 10 in a natural body of water 20, the method further including flushing, via at least one flush pipe assembly 105 that supplies pressurized water from at least one flush gate assembly 106, the screen member 165 to clear entangled objects or materials from the at least one screen member 165.

The following patents are incorporated by reference in their entireties: U.S. Pat. Nos. 3,974,394, 4,132,901, 4,255,933, 4,282,444, 6,359,347, 6,420,794, 6,546,723, 7,084,521, 8,643,206, and 11,053,927.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

Listing of elements:

10 Representative hydropower system
20 Natural body of water
30A Fault line
30B Underground water system
30C River system
40A Solar energy
40B Geothermal energy
40C Gravitational energy
100 First cylindrical tube member
101 Proximal end of the first cylindrical tube member
106 Flush gate assembly
109 Distal end of the first cylindrical tube member
110 Concrete block assembly
120 Turbine tunnel assembly
121 Top portion of turbine tunnel assembly
129 Bottom portion of turbine tunnel assembly
130A, 130B Two oppositely facing, cylindrical water intake members
131A, 131B Proximal end of the two oppositely facing cylindrical water intake members
139A, 139B Distal end of the two oppositely facing cylindrical water intake members
140 Vortex breaker member
141 First stationary blade member
142 Second stationary blade member
150 Turbine generator assembly
151 Non-vertical blade members
155 Central axis
157 electric generator assembly

158 Powerhouse assembly
161 Outermost lattice gate structure
162 Middle lattice gate structure
163 Innermost lattice gate structure
165 Screen member
167 Outermost cell structures
169 Plurality of innermost cell structures
170 Second cylindrical tube member
120 Turbine tunnel assembly
180 Injection hole member
190 Ventilation tower and lift assembly
900-945 Method steps

The invention claimed is:

1. A hydropower system for deployment in a natural body of water comprising:

an at least one first cylindrical tube member with an open proximal end disposed through at least one concrete block assembly and an open distal end coupled to a top portion of a turbine tunnel assembly, a turbine assembly therein, the at least one first cylindrical tube member adapted to carry water from a natural body of water to the turbine tunnel assembly via gravitational forces acting on the water;

at least one cylindrical water intake member coupled at a distal end of the cylindrical water intake member to the proximal end of the at least one first cylindrical tube member and at least partially extending from the at least one concrete block assembly and into the natural body of water;

a proximal end of the at least one cylindrical water intake member coupled to at least one vortex breaker member having at least one first stationary blade member and at least one second stationary blade member, the at least one second stationary blade member intersecting the first stationary blade member along the length of the first stationary blade member wherein the stationary blade members share a substantially common width, the width perpendicular to the length, the first stationary blade member and the at least one second stationary blade member adapted for water to pass substantially without a vortex between and into the water intake member;

at least one turbine generator assembly with a plurality of upwardly angled but non-vertical blade members extending therefrom around a central axis, the plurality of blade members adapted to rotate an electric generator assembly disposed within the turbine generator assembly to generate electricity therefrom, the plurality of blade members rotated by the flow of water over the blades, the water gravitationally disposed from the at least one first cylindrical tube member;

at least one second cylindrical tube member coupled at a proximal end of the at least one second cylindrical tube member to a bottom portion of the turbine tunnel assembly, the at least one second cylindrical tube member coupled at a distal end of the at least one first cylindrical tube member to a top portion of an at least one injection hole member, the at least one injection hole member opening at a distal end of the at least one injection hole member to at least one or more of a fault line, an underground water system, or a river system; and the at least one or more of the fault line, the underground water system, and the river system disposed to impart energy to move the water back into the natural water cycle of the natural body of water via at least one or more of solar, geothermal, or gravitational energy.

2. The hydropower system for deployment in a natural body of water of claim 1 wherein and at least one lattice gate structure substantially circumscribes the cylindrical water intake member, the lattice gate structure adapted to form a plurality of cell structures at or larger than three square centimeters, the cell structures adapted to allow water through while filtering solid materials.

3. The hydropower system for deployment in a natural body of water of claim 2 wherein the outermost of the at least one lattice gate structure is substantially at least forty meters wide by forty meters long by forty meters tall.

4. The hydropower system for deployment in a natural body of water of claim 3 wherein at least one additional lattice gate structure is disposed within the outermost lattice gate structure.

5. The hydropower system for deployment in a natural body of water of claim 1 wherein at least one screen member is coupled to the proximal end of the at least one cylindrical water intake member adapted to filter debris at or larger than half a centimeter.

6. The hydropower system for deployment in a natural body of water of claim 1 wherein at least one flush pipe assembly supplies pressurized water from at least one flush gate assembly adapted to clear entangled objects or materials from at least one screen member.

7. The hydropower system for deployment in a natural body of water of claim 1 wherein the cylindrical water intake member is disposed at least eighty meters below the average surface level of the natural body of water.

8. The hydropower system for deployment in a natural body of water of claim 1 wherein at least one ventilation tower and lift assembly is operationally coupled to the turbine tunnel assembly and adapted to provide access to the surface ground and atmosphere.

9. The hydropower system for deployment in a natural body of water of claim 1 wherein the at least one first cylindrical tube member descends substantially forty meters or more below the cylindrical water intake member.

10. A method of deploying a hydropower system in a natural body of water, the method comprising:

allowing water from the natural body of water to flow into at least one cylindrical water intake member coupled at a distal end of the cylindrical water intake member to a proximal end of at least one first cylindrical tube member and at least partially extending from at least one concrete block assembly and into the natural body of water;

allowing the water to flow down the at least one first cylindrical tube member, the at least one first cylindrical tube member having the open proximal end disposed through the at least one concrete block assembly, the water flowing to an open distal end of the at least one first cylindrical tube member coupled to a top portion of a turbine tunnel assembly, a turbine assembly therein, the at least one first cylindrical tube member adapted to carry water from the natural body of water to the turbine tunnel assembly via gravitational forces acting on the water;

the water from the at least one first cylindrical tube member turning a plurality of upwardly angled but non-vertical blade members extending around a central axis of at least one turbine generator assembly, the plurality of blade members rotating an electric generator assembly disposed within the turbine generator assembly to generate electricity therefrom, the plurality of blade members rotated by the flow of water over the blades, the water gravitationally disposed from the at least one first cylindrical tube member;

allowing the water to flow into at least one second cylindrical tube member coupled at a proximal end of the at least one second cylindrical tube member to a bottom portion of the turbine tunnel assembly, the at least one second cylindrical tube member coupled at a distal end of the at least one first cylindrical tube member to a top portion of an at least one injection hole member;

injecting the water into the at least one injection hole member opening at a distal end of the at least one injection hole member to at least one or more of a fault line, an underground water system, or a river system; and directing the water flow into the at least one or more of the fault line, the underground water system, or the river system, wherein a water cycle system imparts energy to move the water back into the natural water cycle of the natural body of water via at least one or more of solar, geothermal, or gravitational energy.

11. The method of deploying a hydropower system in a natural body of water of claim 10, the method further including screening water from the natural body of water through an at least one lattice gate structure substantially circumscribing the at least one cylindrical water intake member, the lattice gate structure forming a plurality of cell structures at or larger than three square centimeters, the cell structures allowing water through while filtering solid materials.

12. The method of deploying a hydropower system in a natural body of water of claim 10, the method further including screening water through an at least one lattice gate structure disposed within an outermost lattice gate structure.

13. The method of deploying a hydropower system in a natural body of water of claim 10, the method further including screening water through at least one screen member, the screen member coupled to the proximal end of the at least one cylindrical water intake member adapted to filter debris at or larger than half a centimeter.

14. The method of deploying a hydropower system in a natural body of water of claim 10, the method further including flushing, via at least one flush pipe assembly that supplies pressurized water from at least one flush gate assembly, to clear entangled objects or materials from at least one screen member.

15. A hydropower system for deployment in a natural body of water comprising:

a first cylindrical tube member of forty or greater meters long and a diameter at or greater than two meters with an open proximal end disposed through a concrete block assembly and an open distal end coupled to a top portion of a turbine tunnel assembly, a turbine assembly therein, the first cylindrical tube member adapted to carry water from a natural body of water to the turbine tunnel assembly via gravitational forces acting on the water;

two oppositely-facing, cylindrical water intake members coupled at a distal end of the two cylindrical water intake members to the proximal end of the first cylindrical tube member and at least partially extending from the concrete block assembly and into the natural body of water;

the two cylindrical water intake members disposed at least sixty-five meters below the average surface level of the natural body of water;

proximal ends of the two cylindrical water intake members each coupled to at least one vortex breaker member having at least one first stationary blade member and at least one second stationary blade member, the at least one second stationary blade member intersecting the first stationary blade member along the length of the first stationary blade member wherein the stationary blade members share a substantially common width, the width perpendicular to the length, the first stationary blade member and the at least one second stationary blade member adapted for water to pass substantially without a vortex between and into the water intake member;

at least one turbine generator assembly with a plurality of upwardly angled but non-vertical blade members extending therefrom around a central axis, the plurality of blade members adapted to rotate an electric generator assembly disposed within the turbine generator assembly to generate electricity therefrom, the plurality of blade members rotated by the flow of water over the blades, the water gravitationally disposed from the first cylindrical tube member;

an outermost lattice gate structure substantially circumscribing the two cylindrical water intake members about forty meters from the two cylindrical water intake members, the outermost lattice gate structure adapted to form a plurality of outermost cell structures at or larger than five square centimeters, the outermost cell structures adapted to allow water through while filtering solid materials; a middle lattice gate structure substantially circumscribing the two cylindrical water intake members about twenty meters from the two cylindrical water intake members, the middle lattice gate structure adapted to form a plurality of middle cell structures at or larger than three square centimeters, the middle cell structures adapted to allow water through while filtering solid materials;

an innermost lattice gate structure substantially circumscribing the two cylindrical water intake members about ten meters from the two cylindrical water intake members, the innermost lattice gate structure adapted to form a plurality of innermost cell structures at or larger than one square centimeter, the innermost cell structures adapted to allow water through while filtering solid materials;

at least one second cylindrical tube member coupled at a proximal end of the at least one second cylindrical tube member to a bottom portion of the turbine tunnel assembly, the at least one second cylindrical tube member coupled at a distal end of the first cylindrical tube member to a top portion of an at least one injection hole member, the at least one injection hole member opening at a distal end of the at least one injection hole member to at least one or more of a fault line, an underground water system, or a river system; and the at least one or more of the fault line, the underground water system, or the river system disposed to impart energy to move the water back into the natural water cycle of the natural body of water via at least one or more of solar, geothermal, or gravitational energy.

16. The hydropower system for deployment in a natural body of water of claim 15 wherein at least one screen member is coupled to the proximal end of the two cylindrical water intake members adapted to filter debris at or larger than half a centimeter.

17. The hydropower system for deployment in a natural body of water of claim 15 wherein at least one flush pipe assembly supplies pressurized water from at least one flush gate assembly adapted to clear entangled objects or materials from at least one screen member.

18. The hydropower system for deployment in a natural body of water of claim 15 wherein the two cylindrical water intake members are disposed at least eighty meters below the average surface level of the natural body of water.

19. The hydropower system for deployment in a natural body of water of claim 15 wherein at least one ventilation tower and lift assembly is operationally coupled to the turbine tunnel assembly and adapted to provide access to the surface ground and atmosphere.

20. The hydropower system for deployment in a natural body of water of claim 15 wherein the first cylindrical tube member descends substantially forty meters or more below the two cylindrical water intake members.

* * * * *